United States Patent
Ting et al.

(10) Patent No.: US 7,345,721 B2
(45) Date of Patent: Mar. 18, 2008

(54) TRANSFLECTIVE LIQUID CRYSTAL DISPLAY AND COLOR FILTER WITH TWO KINDS OF COLOR RESISTS FOR THE SAME

(75) Inventors: Dai-Liang Ting, Hsinchu (TW);
Chi-Jain Wen, Hsinchu (TW);
Chi-Ming Cheng, Tainan (TW);
Kuang-Lung Kuo, Jhongli (TW);
Hsiang-Ju Chuang, Hsinchu (TW);
Chia-Yi Tsai, Ilan Hsien (TW)

(73) Assignee: TPO Displays Corp., Chu-Nan (TW)

( * ) Notice: Subject to any disclaimer, the term of this patent is extended or adjusted under 35 U.S.C. 154(b) by 599 days.

(21) Appl. No.: 11/005,908

(22) Filed: Dec. 6, 2004

(65) Prior Publication Data
US 2006/0119770 A1 Jun. 8, 2006

(51) Int. Cl.
*G02F 1/1335* (2006.01)
(52) U.S. Cl. ...................................... 349/114; 349/106
(58) Field of Classification Search ................. 349/106, 349/114
See application file for complete search history.

(56) References Cited

U.S. PATENT DOCUMENTS

| 6,215,538 | B1 | 4/2001 | Narutaki et al. |
| 6,501,521 | B2 | 12/2002 | Matsushita et al. |
| 6,621,543 | B2 | 9/2003 | Moon |
| 7,148,938 | B2 * | 12/2006 | Nakamura et al. .......... 349/106 |
| 2004/0196422 | A1 | 10/2004 | Arai et al. |
| 2005/0052593 | A1 | 3/2005 | Ting et al. |

FOREIGN PATENT DOCUMENTS

CN 1428639 7/2003

* cited by examiner

*Primary Examiner*—David Nelms
*Assistant Examiner*—Richard H Kim
(74) *Attorney, Agent, or Firm*—Liu & Liu

(57) ABSTRACT

A color filter including red, green, and blue resists in three subpixel regions in each pixel region is disclosed. One pixel region includes two kinds of color resists, and the color resist in the reflective region has lower purity than the color resist in the transmissive region. Another pixel region includes only one kind of color resist.

16 Claims, 10 Drawing Sheets

TRANSFLECTIVE LIQUID CRYSTAL DISPLAY AND COLOR FILTER WITH TWO KINDS OF COLOR RESISTS FOR THE SAME

BACKGROUND OF THE INVENTION

1. Field of the Invention

The present invention relates to a color filter, and more particularly to a color filter for a transflective liquid crystal display.

2. Description of the Related Art

Liquid crystal displays (LCDs) are divided into three types: transmissive LCDs, reflective LCDs, and transflective LCDs. The transmissive LCD displays show images using light from a back light device. Only about 10% of light generated by the back light is utilized after passing through polarizers and LCD panel. Therefore, the transmissive LCD employs a backlight device capable of high brightness, requiring high power consumption. The reflective LCD uses ambient light to display images, thus reducing power consumption. The reflective LCD, however, can only be used during the day or in an office where external light is present, but not under dim lighting conditions.

Therefore, transflective LCDs have been introduced. FIG. 1 is a cross-section of a conventional transflective liquid crystal display. The transflective LCD includes opposing upper and lower substrates 160 and 150, a liquid crystal layer 180 interposed therebetween, and a backlight 170 under the lower substrate 150. A common electrode 162 is formed between the upper substrate 160 and the liquid crystal layer 180. A transmissive electrode 164 is formed in the transmissive region t of the lower substrate 150. A reflective electrode 152 is formed in the reflective region r of the lower substrate 150. A color filter layer 168 is interposed between the upper substrate 160 and common electrode 162. In transmissive mode, light 174 emitted from the backlight 170 passes through the lower substrate 150, the transmissive electrode 164, the color filter layer 168, and the upper substrate 160. In reflective mode, ambient light 172 passes through the upper substrate 160 and color filter layer 168, is incident to the reflective electrode 152, is reflected by the reflective electrode 152, and passes through the color filter layer 168 and the upper substrate 160 again.

As mentioned above, in the transmissive region t, light 174 emitted from the backlight 170 passes through the color filter layer 168 only once. In the reflective region r, however, ambient light 172 passes through the color filter 168 twice. Consequently, the color saturation in the reflective region will be higher than that in the transmissive region.

In order to solve the above problem, Tomohisa Matsushita et al. in U.S. Pat. No. 6,501,521 disclose forming a hole or slit in the color resist in the reflective region and then filling a transparent material therein, thus changing the color saturation in the reflective region. For example, FIG. 2 is a top view of color resists in a pixel region of a transflective liquid crystal display. The pixel includes R (red), G (green), and B (blue) subpixel regions. Each subpixel region includes reflective and transmissive regions. The reflective regions are labeled R(r), G(r) and B(r), the transmissive regions are labeled R(t), G(t) and B(t), and the color resists are labeled 210R, 220G, and 230B. The red resist 210R in the reflective region R(r) in the R subpixel region is partially removed and then filled with a transparent material 210W. The green resist 220G in the reflective region G(r) in the G subpixel region is partially removed and then filled with a transparent material 220W. The blue resist 230B in the reflective region B(r) in the B subpixel region is partially removed and then filled with a transparent material 230W. Color mixing of the transparent and color resists in the reflective region can be controlled by adjusting the size of the opening, in order to decrease the color saturation in the reflective region. Thus, the color saturation in the reflective and transmissive regions becomes substantially equal.

The above method can decrease the color saturation in the reflective region. However, referring to FIG. 3, the color saturation (NTSC(%)) in the reflective region is limited when brightness is low (Y<15.0) and differs greatly from the color saturation in the transmissive region.

A resist direct electrodeposition method is used so as to produce a color filter with different color purity between the transmission regions and the reflection regions. With this method, color filter portions with different color purity are formed in the transmission regions and in the reflection regions for each color. In this way, it is possible to increase the color saturation in a transmission mode while maintaining the brightness in a reflection mode. However, forming color filter portions of different transmittances in the transmission regions and in the reflection regions increases the number of steps in the color filter electrodeposition process. Specifically, electrodepositing reflection color filter portions and transmission color filter portions for each of R, G and B requires a total of six photolithography steps. Moreover, it requires two color filter materials of different color purity for each color. Thus, the production cost increases.

SUMMARY OF THE INVENTION

The present invention provides improvements over the prior art color filter configurations for transflective liquid crystal displays, including simplifying the color filter structure by limiting color saturation compensation at the reflective region of the color that is most sensitive to a viewer under anticipated ambient lighting conditions (e.g., halogen light, incandescent light, . . . etc.), to offset non-uniformity in color saturation between the reflective and transmissive regions for the color. In one aspect, the present invention compensates for the increase in color saturation in the reflective region by providing a color filter material that has a reduced color purity compared to that at the transmissive region. The color saturation between the reflective region and the transmissive region of the color subpixel region being compensated can be balanced (e.g., to make more uniform or to achieve a desired overall color saturation in reference to the other two color subpixel regions) by taking into consideration one or more of the following factors: the relative area of the reduced color purity area over the reflective electrode, the relative color purity between the reflective region and the transmissive region, the effect or relationship of the color purity level and the area of the reduced color purity area at the reflective region, how the other color subpixel regions (e.g., size, color, intensitity, etc.) may affect the size and/or color purity level at the reflective region of the color subpixel region that is being compensated in order to obtain the overall color saturation effect, choice of color subpixel region being compensated, relative sizes of the three color subpixel regions.

The present invention also provides a transflective liquid crystal display panel including the above color filter.

The present invention also provides a transflective liquid crystal display device including the above color filter.

The color filter of the present invention includes a plurality of pixel regions, each pixel region includes three subpixel regions, and each subpixel region includes a transmissive region and a reflective region. The color filter in each pixel region includes three color resists of different color, that is, R (red), G (green) and B (blue). The feature of the present invention resides in that one subpixel region includes two kinds of color resists and the color resist in the reflective region has lower color purity than the color resist in the transmissive region, while another subpixel region includes only one kind of color resist.

BRIEF DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

It is noted that the description hereinbelow refers to various layers arranged on, above or overlying other layers, to describe the relative positions of the various layers. References to "on", "above", "overlying", or other similar languages, are not limited to the interpretation of one layer being immediately adjacent another layer. There may be intermediate or interposing layers, coatings, or other structures present, and associated process steps present, which are not shown or discussed herein, but could be included without departing from the scope and spirit of the invention disclosed herein. Similarly, references to structures adjacent, between or other positional references to other structures merely describe the relative positions of the structures, with or without intermediate structures.

Figure 1:
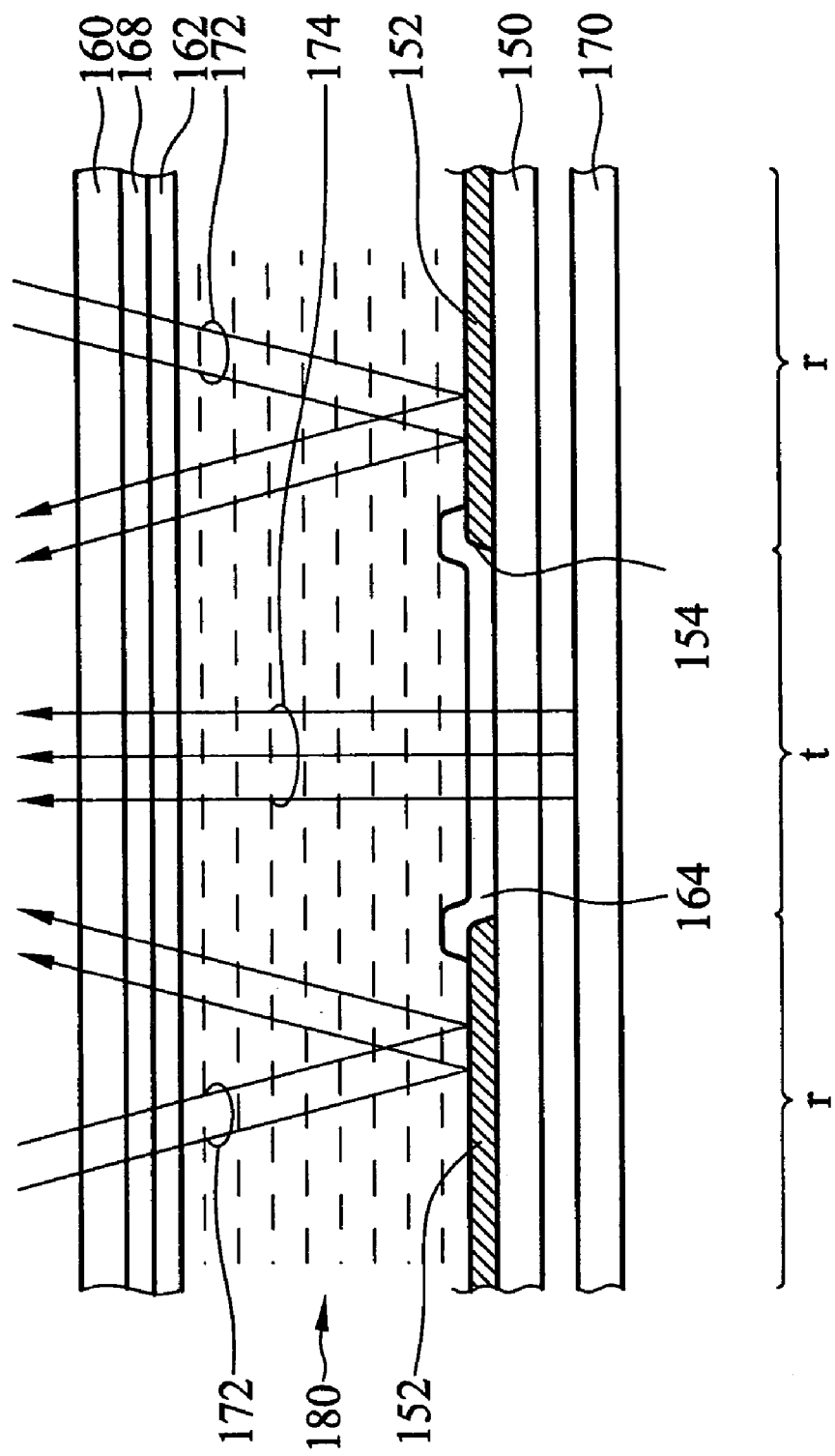
FIG. 1 is a cross-sectional view of a conventional transflective LCD.
Figure 2:
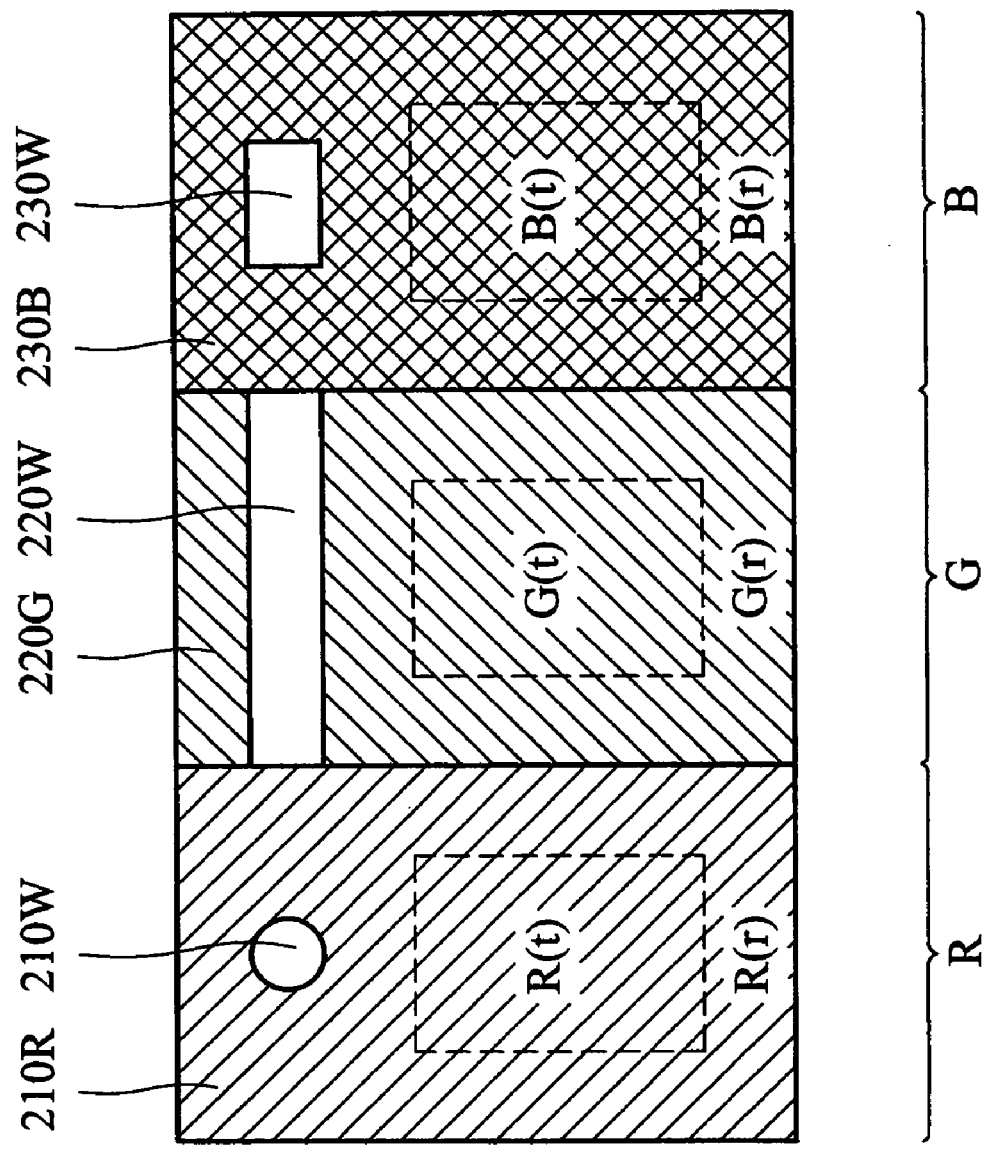
FIG. 2 is a top view of color resists in a pixel region of another conventional transflective LCD.
Figure 3:
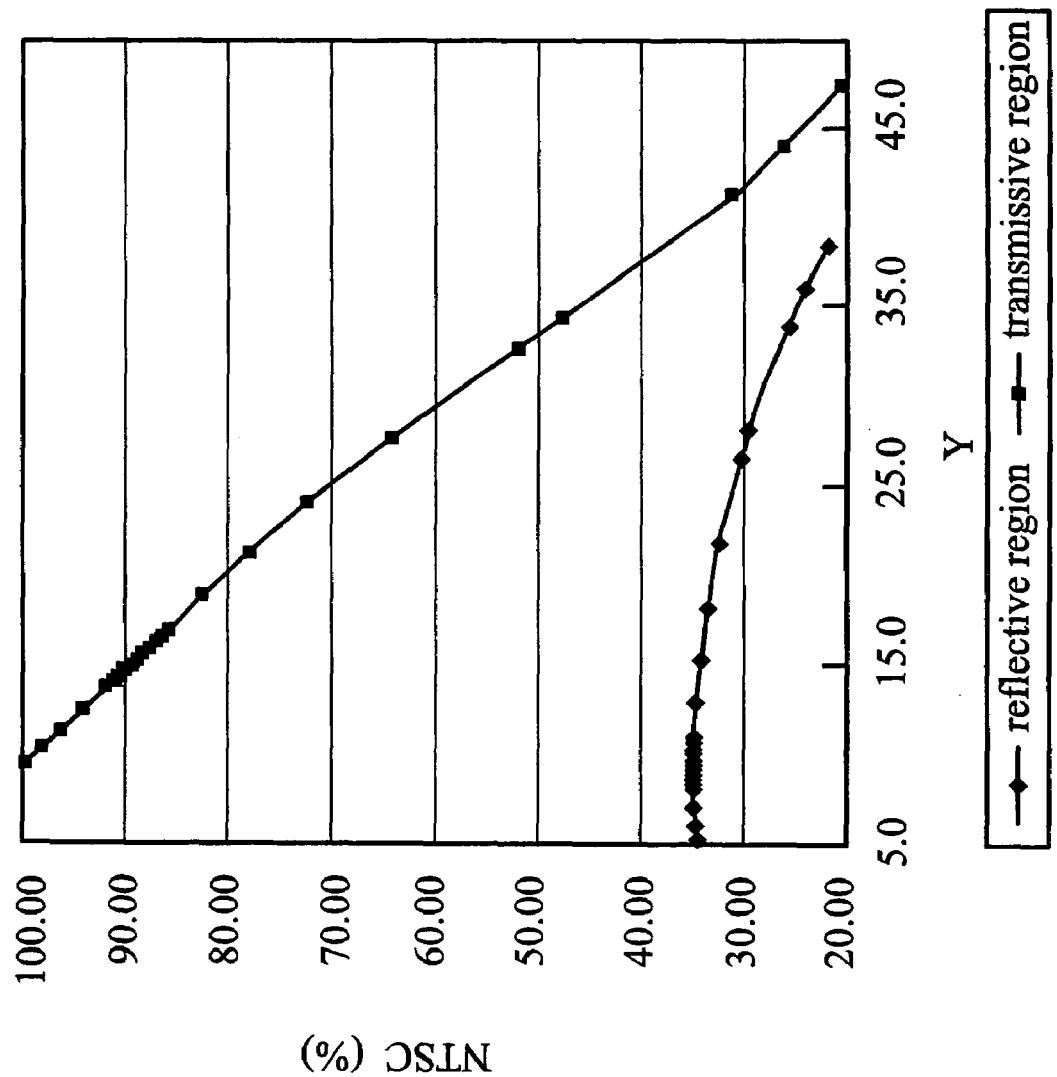
FIG. 3 shows the relationship between the color saturation and Y of a conventional color filter.
Figure 4:
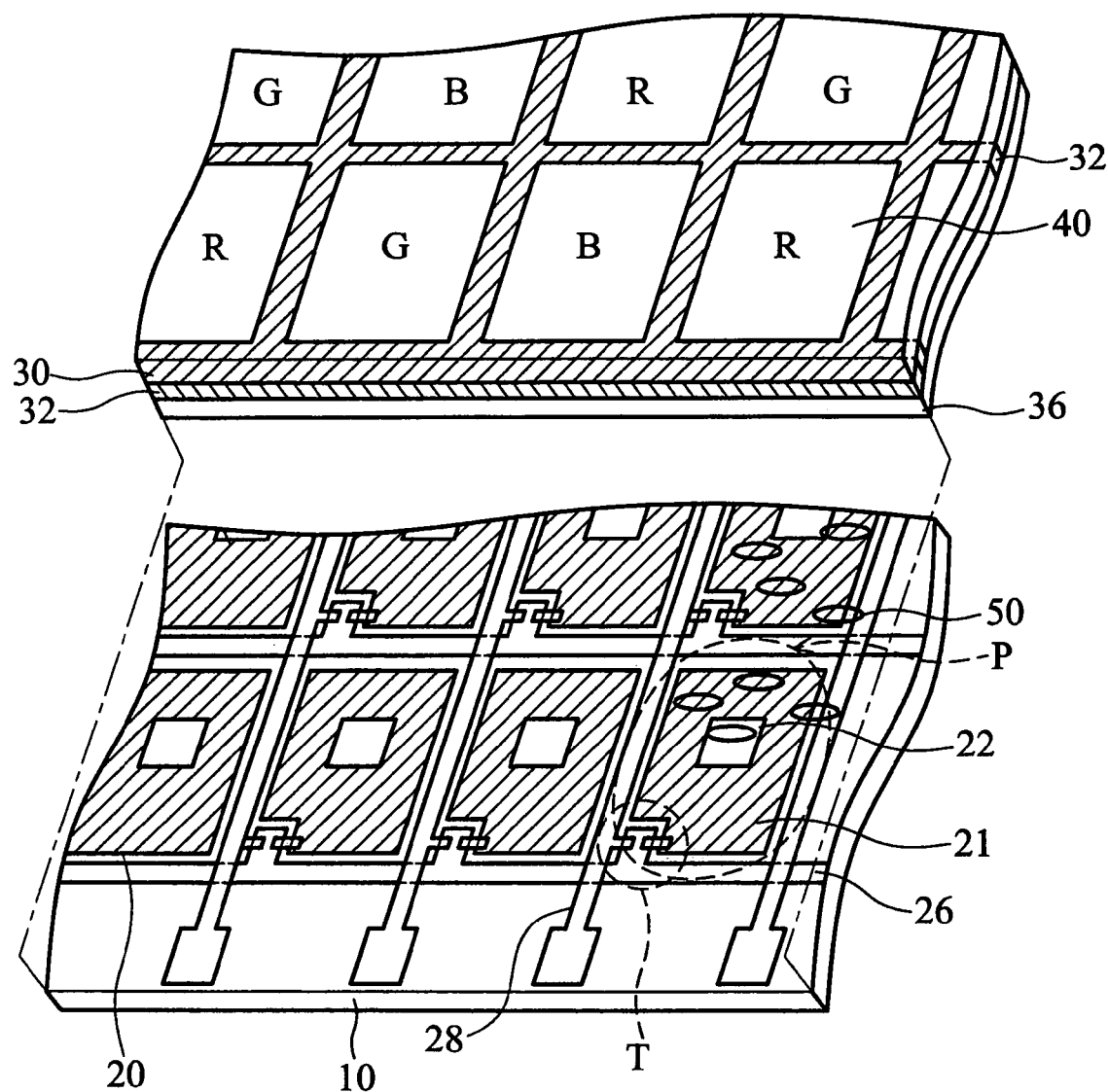
FIG. 4 is an exploded perspective view illustrating a transflective LCD panel according to embodiments of the invention.

FIG. 4 is an exploded perspective view illustrating a transflective LCD panel 1 according to embodiments of the invention. The transflective LCD panel 1 includes upper and lower substrates 30 and 10 with a liquid crystal layer 50 interposed therebetween. The upper substrate 30 is a color filter substrate and the lower substrate 10 is an array substrate. In the upper substrate 30, on a surface opposing the lower substrate 10, a black matrix 32 and a color filter layer 40 including a plurality of red (R), green (G) and blue (B) color filters are formed. That is, the black matrix 32 surrounds each color filter, in the shape of an array matrix. Further on the upper substrate 30, a common electrode 36 is formed to cover the color filter layer 40 and the black matrix 32.

In the lower substrate 10, on a surface opposing the upper substrate 30, a plurality of TFTs "T" serving as switching devices are formed in shape of an array matrix corresponding to the color filters 40. In addition, a plurality of crossing gate and data lines 26 and 28 are positioned such that each TFT is located near each cross point of the gate and data lines 26 and 28. Further on the lower substrate 10, a plurality of pixel regions (P) are defined by the gate and data lines 26 and 28. Each pixel region P has a pixel electrode 20 comprising a transparent portion 22 and an opaque portion 21. The transparent portion 22 comprises a transparent conductive material, such as ITO (indium tin oxide) or IZO (indium zinc oxide), and the opaque portion 22 comprises a metal having high reflectivity, such as Al (aluminum).

According to the present invention, one subpixel region includes different kinds of color resists in reflective and transmissive regions respectively, while another subpixel region includes only one kind of color resist. The color resist in the reflective region has lower color purity, and the color resist in the transmissive region has higher color purity. In this way, color saturation in the entire reflective region is reduced, thus allowing the desired color saturation distribution between the reflective region and the transmissive region to be balanced, such as to make the color saturation in reflective and transmissive regions to be substantially equal.

Figure 5:
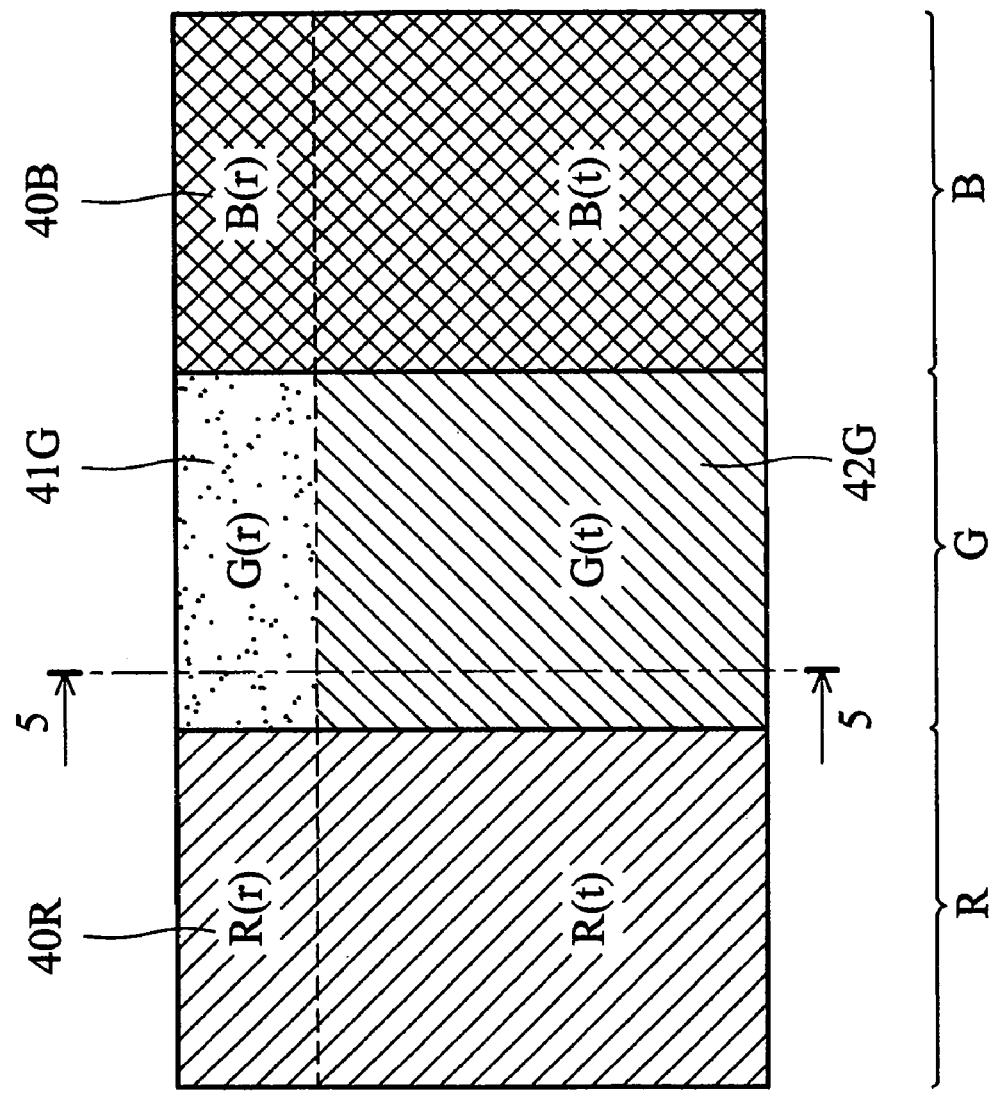
FIG. 5 is a top view of the color filter in a pixel unit according to a first embodiment of the present invention.

FIG. 5 is a top view of the color filter in a pixel unit according to a first embodiment of the present invention. The pixel unit includes three subpixel regions: R, G, and B. It shows that two green resists of different color purity are used in the green subpixel region. Corresponding to the reflective and transmissive regions of the array substrate (FIG. 5 shows a portion of the array substrate 10), each subpixel region of the color filter includes reflective and transmissive regions, that is, a red reflective region R(r), a green reflective region G(r), a blue reflective region B(r), a red transmissive region R(t), a green transmissive region G(t), and a blue transmissive region B(t). FIG. 5 shows that in the subpixel region, the reflective region is adjacent to the transmissive region. However, the invention is not limited to this. The reflective region in the subpixel region can also surround the transmissive region (see FIG. 7).

Referring to FIG. 5, the R subpixel region uses one kind of red resist 40R, and the B subpixel region uses one kind of blue resist 40B. However, the G subpixel region uses two green resists: a first green resist 41G disposed in the green reflective region G(r), and a second green resist 42G disposed in the green transmissive region G(t). The first green resist 41G has lower color purity than the second green resist 42G.

Figure 6:
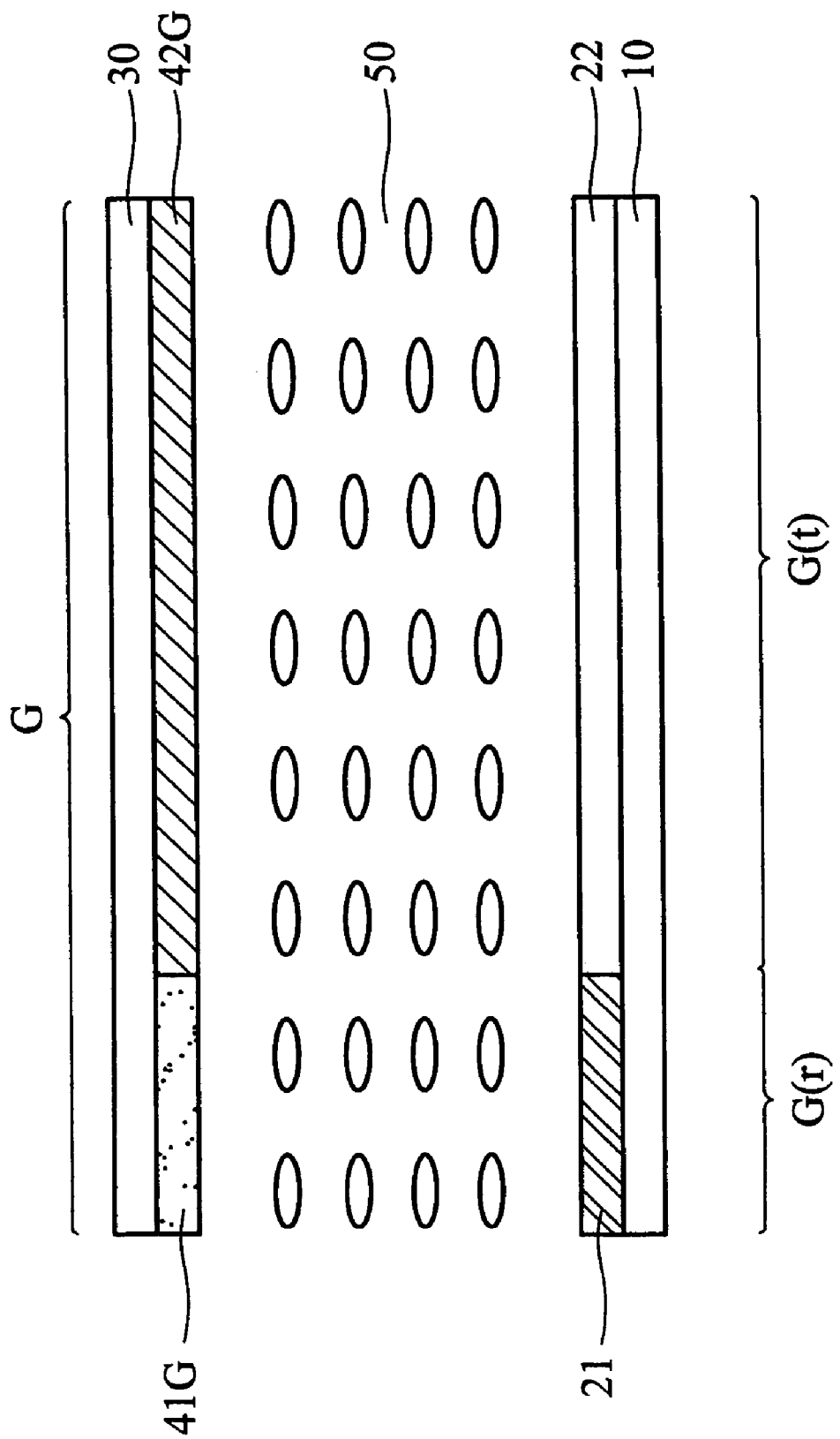
FIG. 6 shows a transflective liquid crystal display panel, which is a cross-section taken along line 5-5 of FIG. 5.

FIG. 6 is a cross-section of a subpixel of the transflective LCD panel 1 taken along line 5-5 of FIG. 5, showing the G subpixel region. Referring to FIG. 6, the transflective LCD panel 1 includes a first substrate 10, a second substrate 30, and a liquid crystal layer 50 interposed therebetween. The G subpixel region includes a first green resist 41G corresponding to a reflective electrode 21, and a second green resist 42G corresponding to a transmissive electrode 22. Since the first green resist 41G in the reflective region G(r) has lower color purity than the second green resist 42G in the transmissive region G(t), the color saturation in the entire reflective region is reduced, thus the color saturation in the entire reflective and transmissive regions becomes substantially equal. The color filter of the present invention can be produced on either the first substrate 10 or the second substrate 30. Put simply, the color filter of the first embodiment includes one kind of red resist 40R, one kind of blue resist 40B, and two kinds of green resists 41G and 42G. Additionally, the green resist 41G in the reflective region has lower color purity than the green resist 42G in the transmissive region.

Figure 7:
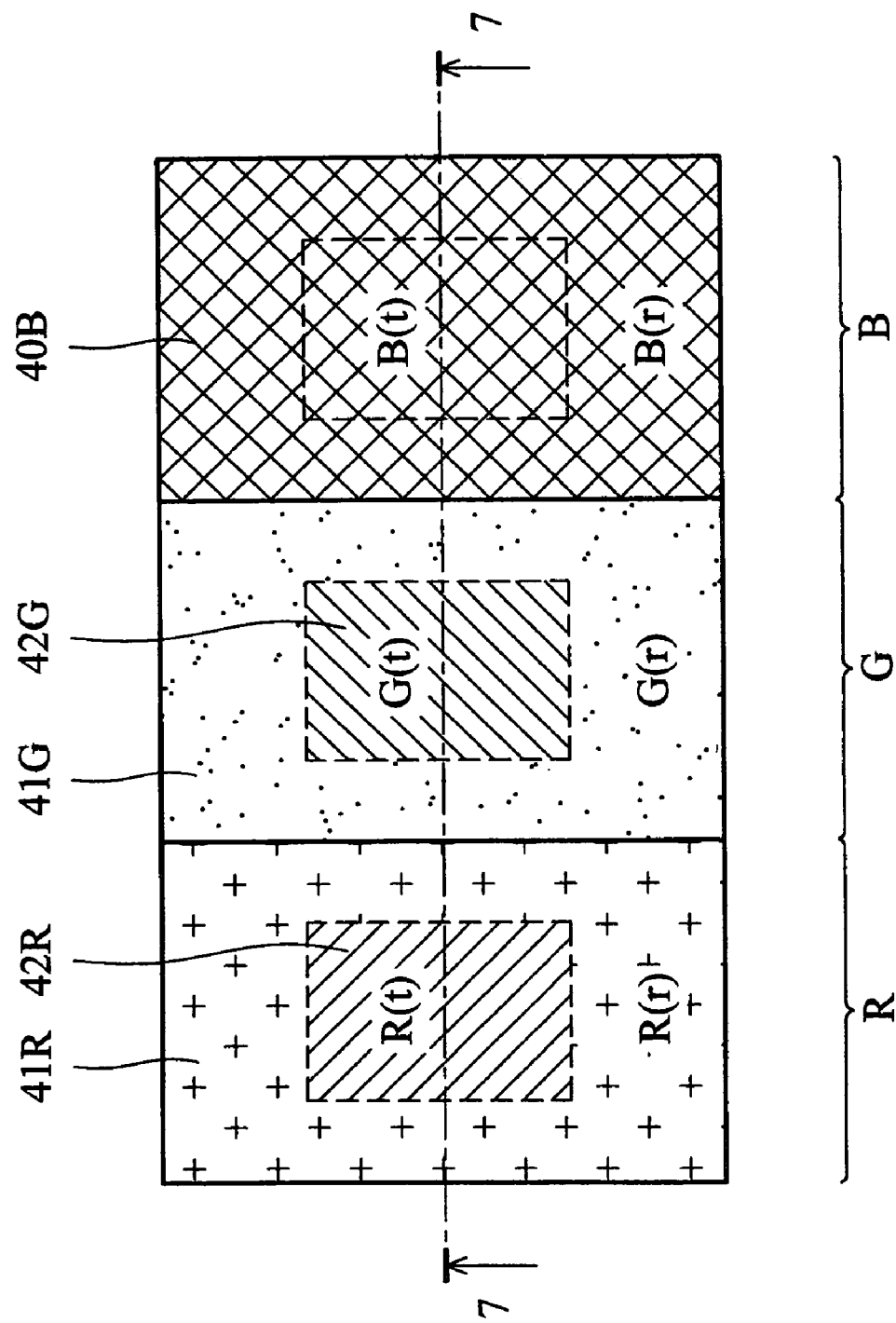
FIG. 7 is a top view of the color filter in a pixel unit according to a second embodiment of the present invention.

FIG. 7 is a top view of the color filter in a pixel unit according to a second embodiment of the present invention, showing that two color resists of different color purity are used in green and red subpixel regions respectively. The pixel unit includes three subpixel regions: R, G, and B, and each subpixel region includes reflective and transmissive regions, that is, a red reflective region R(r), a green reflective region G(r), a blue reflective region B(r), a red transmissive region R(t), a green transmissive region G(t), and a blue transmissive region B(t).

The B subpixel region uses one kind of blue resist 40B. The G subpixel region uses two kinds of green resists: a first green resist 41G disposed in the green reflective region G(r), and a second green resist 42G disposed in the green transmissive region G(t), wherein the first green resist 41G has lower color purity than the second green resist 42G. The R subpixel region uses two kinds of red resists: a first red resist 41R disposed in the red reflective region R(r), and a second red resist 42B disposed in the red transmissive region R(t), wherein the first red resist portion 41R has lower color purity than the second red resist portion 42R. In FIG. 7, the reflective region in the subpixel region surrounds the transmissive region.

Figure 8:
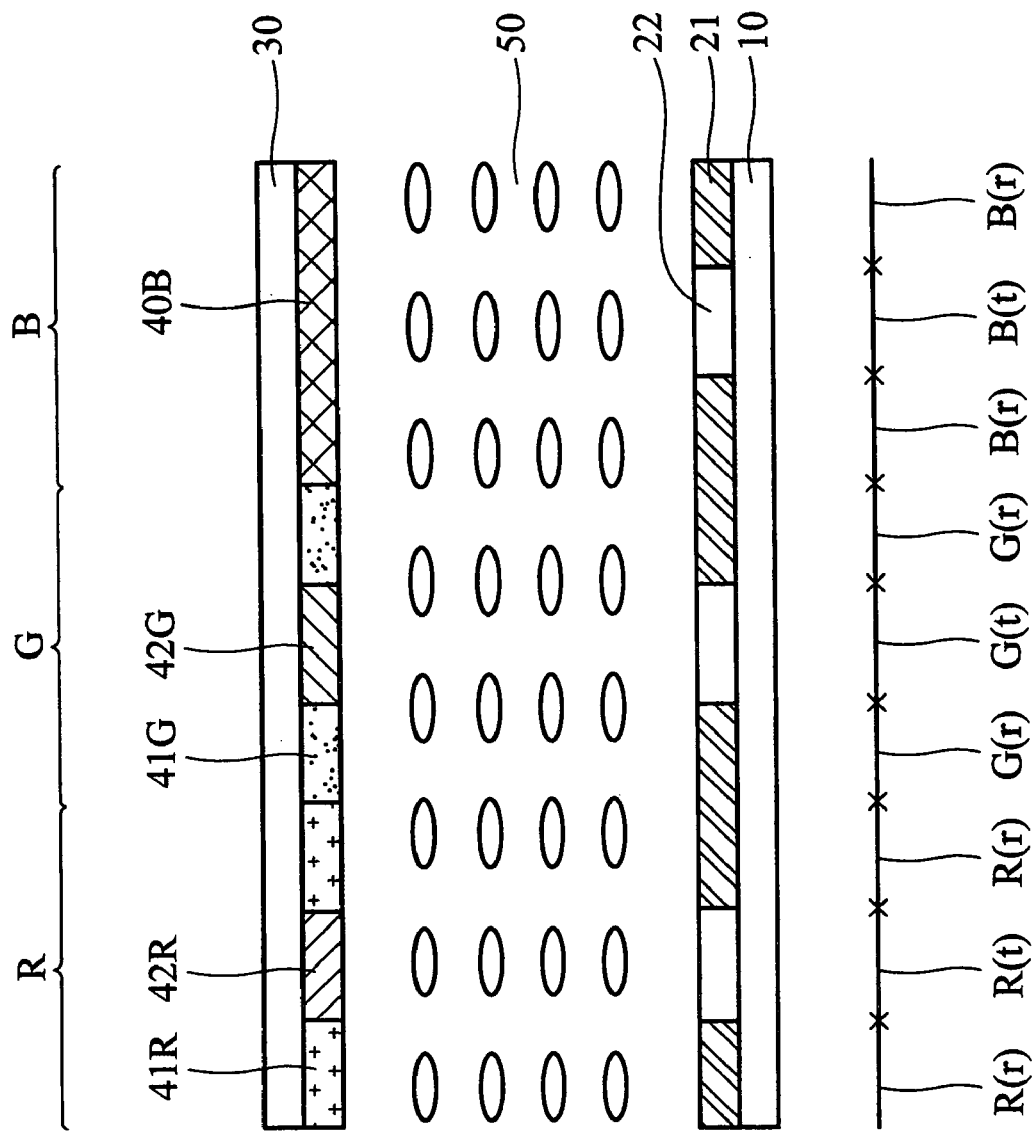
FIG. 8 is a cross-sectional view of a transflective LCD panel taken along line 7-7 of FIG. 7.

FIG. 8 is a cross-section of a transflective LCD panel taken along line 7-7 of FIG. 7. Referring to FIG. 8, the transflective LCD panel includes a first substrate 10, a second substrate 30, and a liquid crystal layer 50 interposed therebetween. The G subpixel region includes a first green resist 41G corresponding to a reflective electrode 21, and a second green resist 42G corresponding to a transmissive region 22. The R subpixel region includes a first red resist 41R corresponding to a reflective electrode 21, and a second red resist 42R corresponding to a transmissive region 22.

Since the first green resist portion 41G in the reflective region G(R) has lower color purity than the second green resist portion 42G in the transmissive region G(t), and the first red resist portion 41R in the reflective region R(r) has lower color purity than the second red resist portion 42R in the transmissive region R(t), the color saturation in the entire reflective region is reduced, thus the color saturation in the entire reflective and transmissive regions becomes substantially equal. The color filter of the present invention can be produced on either the first substrate 10 or the second substrate 30.

Figure 10:
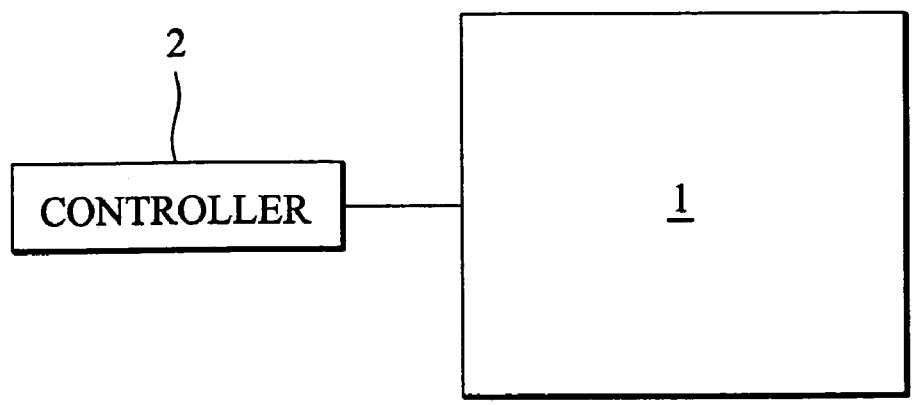
FIG. 10 is a schematic diagram of a transflective LCD device incorporating the color filter configuration in accordance with the present invention.

FIG. 10 is a schematic diagram illustrating a liquid crystal display device incorporating the transflective liquid crystal display panel 1 of FIG. 4 manufactured according to the first embodiment of the present invention. The LCD panel 1 as shown in FIG. 4 is coupled to a controller 2 to form a LCD device 3. The controller 2 can comprise a source and gate driving circuits (not shown) to control the LCD panel 1 to render image in accordance with an input.

Figure 11:
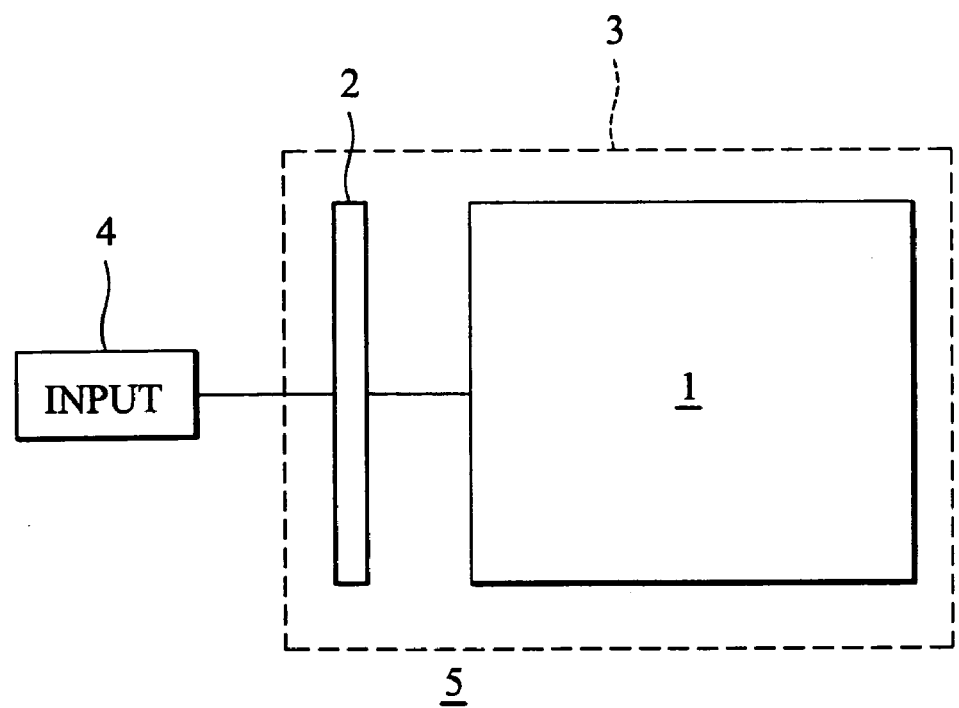
FIG. 11 is a schematic diagram of an electronic device having a transflective LCD device incorporating the color filter configuration in accordance with the present invention.

FIG. 11 is a schematic diagram illustrating an electronic device incorporating the LCD device 3 shown in FIG. 10. An input device 4 is coupled to the controller 2 of the LCD device 3 to form an electronic device 5. The input device 4 can include a processor or the like to input data to the controller 2 to render an image. The electronic device 5 may be a portable device such as a PDA, notebook computer, tablet computer, cellular phone, or a display monitor device, or non-portable device such as a desktop computer.

Put simply, the color filter of the second embodiment includes one kind of blue resist 40B; two kinds of green resists 41G and 42G, wherein the green resist 41G in the reflective region has lower color purity than the green resist 42G in the transmissive region; and two kinds of red resists 41R and 42R, wherein the red resist 41R in the reflective region has lower color purity than the red resist 42R in the transmissive region.

The transmissive electrode is defined as an electrode in the transmissive region, and the reflective electrode is defined as an electrode in the reflective region.

Computer Simulation (1) The four-color-resist color filter of the present invention includes one kind of blue resist, one kind of red resist, and two kinds of green resists. The green resist in the reflective region has lower color purity than the green resist in the transmissive region.

(2) The five-color-resist color filter of the present invention includes one kind of blue resist, two kinds of red resists, and two kinds of green resists. The red resist in the reflective region has lower color purity than the red resist in the transmissive region. The green resist in the reflective region has lower color purity than the green resist in the transmissive region.

(3) A conventional six-color-resist color filter includes two kinds of red resists, two kinds of green resists, and two kinds of blue resists. Red, green, and blue resists in the reflective region have lower color purity than red, green, and blue resists in the transmissive region respectively.

Figure 9:
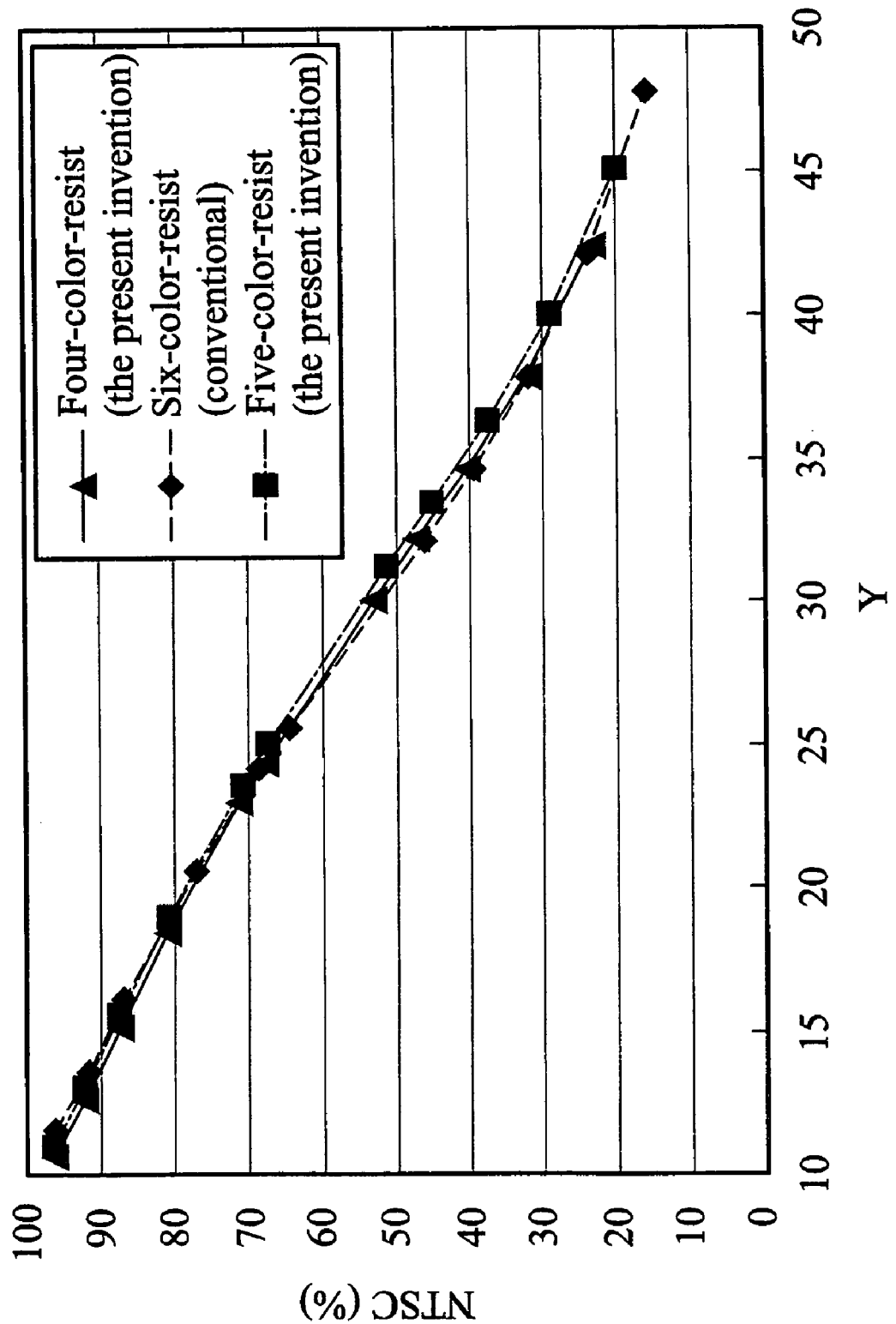
FIG. 9 shows the relationship between the color saturation and Y of the four-color-resist (the present invention), five-color-resist (the present invention), and six-color-resist (conventional) color filters.

The above three types of color filters were simulated in a computer. The relationship between color saturation (NTSC (%)) and brightness (Y) are shown in FIG. 9. It can be seen that the four-color-resist and five-color-resist color filters of the present invention still maintains similar color property to the conventional six-color-resist color filter. In conclusion, in the present invention, one subpixel region uses two kinds of color resists, and the color resist in the reflective region has lower color purity than the color resist in the transmissive region; while another subpixel region uses only one kind of color resist. Compared with the conventional six-color-resist color filter, the present invention reduces production procedures while still maintaining substantially equal color saturation in reflective and transmissive regions.

The foregoing description of the preferred embodiments of this invention has been presented for purposes of illustration and description. Obvious modifications or variations are possible in light of the above teaching. The embodiments chosen and described provide an excellent illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

What is claimed is:

1. A color filter including a plurality of pixel regions, each pixel region including a plurality of color resists of different colors, each corresponding to a different subpixel region, each subpixel region including a transmissive region and a reflective region, wherein at least one subpixel region includes two kinds of color resists respectively in the transmissive and reflective regions, the color resist in the reflective region having lower color purity than the color resist in the transmissive region, and at least another subpixel region includes only one kind of color resist.

2. The color filter as claimed in claim 1, wherein the plurality of color resists include a red resist, wherein the red resist includes a first red resist in the reflective region and a second red resist in the transmissive region, the first red resist having lower color purity than the second red resist.

3. The color filter as claimed in claim 1, wherein the plurality of color resists include a green resist, wherein the green resist includes a first green resist in the reflective region and a second green resist in the transmissive region, the first green resist having lower color purity than the second green resist.

4. The color filter as claimed in claim 1, wherein the plurality of color resists include a blue resist, wherein the blue resist includes a first blue resist in the reflective region and a second blue resist in the transmissive region, the first blue resist having lower color purity than the second blue resist.

5. The color filter as claimed in claim 1, wherein the plurality of color resists include a red resist, a green resist and a blue resist, and wherein the red resist includes a first red resist in the reflective region and a second red resist in the transmissive region, the first red resist having lower color purity than the second red resist; and the green resist includes a first green resist in the reflective region and a second green resist in the transmissive region, the first green resist having lower color purity than the second green resist.

6. The color filter as claimed in claim 1, wherein the plurality of color resists include a red resist, a green resist and a blue resist, and wherein the red resist includes a first red resist in the reflective region and a second red resist in the transmissive region, the first red resist having lower color purity than the second red resist; and the blue resist includes a first blue resist in the reflective region and a second blue resist in the transmissive region, the first blue resist having lower color purity than the blue green resist.

7. The color filter as claimed in claim 1, wherein the plurality of color resists include a red resist, a green resist and a blue resist, and wherein the green resist includes a first green resist in the reflective region and a second green resist in the transmissive region, the first green resist having lower color purity than the second green resist; and the blue resist includes a first blue resist in the reflective region and a second blue resist in the transmissive region, the first blue resist having lower color purity than the second blue resist.

8. A transflective liquid crystal display panel comprising:

a first substrate;

a second substrate opposing the first substrate;

a color filter as in claim 1;

a plurality of reflective electrodes supported on the second substrate at locations corresponding to the reflective regions of the subpixel regions; and a plurality of transmissive electrodes supported on the second substrate at locations corresponding to the transmissive regions of the subpixel regions, a liquid crystal layer interposed between the first and second substrates.

9. The transflective liquid crystal display panel as claimed in claim 8, wherein the plurality of color resists include a red resist, wherein the red resist includes a first red resist in the reflective region and a second red resist in the transmissive region, the first red resist having lower color purity than the second red resist.

10. The transflective liquid crystal display panel as claimed in claim 8, wherein the plurality of color resists include a green resist, wherein the green resist includes a first green resist in the reflective region and a second green resist in the transmissive region, the first green resist having lower color purity than the second green resist.

11. The transflective liquid crystal display panel as claimed in claim 8, wherein the plurality of color resists include a blue resist, wherein the blue resist includes a first blue resist in the reflective region and a second blue resist in the transmissive region, the first blue resist having lower color purity than the second blue resist.

12. The transflective liquid crystal display panel as claimed in claim 8, wherein the plurality of color resists include a red resist, a green resist and a blue resist, and wherein the red resist includes a first red resist in the reflective region and a second red resist in the transmissive region, the first red resist having lower color purity than the second red resist; and the green resist includes a first green resist in the reflective region and a second green resist in the transmissive region, the first green resist having lower color purity than the second green resist.

13. The transflective liquid crystal display panel as claimed in claim 8, wherein the plurality of color resists include a red resist, a green resist and a blue resist, and wherein the red resist includes a first red resist in the reflective region and a second red resist in the transmissive region, the first red resist having lower color purity than the second red resist; and the blue resist includes a first blue resist in the reflective region and a second blue resist in the transmissive region, the first blue resist having lower color purity than the blue green resist.

14. The transflective liquid crystal display panel as claimed in claim 8, wherein the plurality of color resists include a red resist, a green resist and a blue resist, and wherein the green resist includes a first green resist in the reflective region and a second green resist in the transmissive region, the first green resist having lower color purity than the second green resist; and the blue resist includes a first blue resist in the reflective region and a second blue resist in the transmissive region, the first blue resist having lower color purity than the second blue resist.

15. A transflective liquid crystal display device, comprising:
the transflective liquid crystal display panel as claimed in claim 8; and
a controller coupled to the transflective liquid crystal display panel to control the panel to render an image in accordance with an input.

16. An electronic device, comprising:
the transflective liquid crystal display device as claimed in claim 15; and
an input device coupled to the controller of the transflective liquid crystal display device to control the transflective liquid crystal display device to render an image.

* * * * *